United States Patent
Cho et al.

(10) Patent No.: US 7,519,228 B2
(45) Date of Patent: Apr. 14, 2009

(54) METHOD AND APPARATUS FOR ENCRYPTING AND COMPRESSING MULTIMEDIA DATA

(75) Inventors: Song-yean Cho, Seoul (KR); Byung-in Mun, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 1042 days.

(21) Appl. No.: 10/717,647

(22) Filed: Nov. 21, 2003

(65) Prior Publication Data

US 2004/0136566 A1      Jul. 15, 2004

(30) Foreign Application Priority Data

Nov. 21, 2002    (KR) .................... 10-2002-0072813

(51) Int. Cl.
| | |
|---|---|
| G06K 9/36 | (2006.01) |
| H04B 1/66 | (2006.01) |
| H04B 14/04 | (2006.01) |
| H04N 7/12 | (2006.01) |
| H04N 1/32 | (2006.01) |
| H04N 7/167 | (2006.01) |

(52) U.S. Cl. .................. 382/232; 382/166; 375/240; 375/242; 348/384.1; 358/426.01; 380/200

(58) Field of Classification Search ......... 380/200–242, 380/255–276; 725/31; 382/232–254; 375/240–253; 348/381.1, 390.1, 395.1, 403.1, 420.1; 358/426.01–426.16
See application file for complete search history.

(56) References Cited

U.S. PATENT DOCUMENTS 4,468,708 A * 8/1984 Coleman, Jr. ............ 386/33

(Continued)

FOREIGN PATENT DOCUMENTS

JP      6-90451 A     3/1994

(Continued)

OTHER PUBLICATIONS

Lei Tang, "Methods for encrypting and decrypting MPEG video data efficiently", 1997, Proceedings of the fourth ACM international conference on Multimedia, pp. 219-229.*

(Continued)

*Primary Examiner*—Matthew C Bella
*Assistant Examiner*—Manav Seth
(74) *Attorney, Agent, or Firm*—Sughrue Mion, PLLC

(57) ABSTRACT

Disclosed herein is a method and apparatus for encrypting and compressing multimedia data, which transforms and compresses multimedia data through an encryption key in a process of compressing the multimedia data to record and transmit the data, and encrypts the multimedia data to allow the data to be decoded using only the encryption key. The method includes creating Discrete Cosine Transform (DCT) coefficients by applying input multimedia data to a DCT unit, and quantizing the DCT coefficients; encrypting and compressing transformed Differential Coefficients (DC coefficient) and transformed Amplitude Coefficients (AC coefficient) by transforming encoded DC and AC coefficients depending on a certain encryption key at the time of entropy encoding quantized DC and AC coefficients of the quantized DCT coefficients; and Huffmann coding the encrypted DC and AC coefficients and outputting the coded DC and AC coefficients. The method is a data compression method suitable for processing multimedia data for wireless communication.

7 Claims, 9 Drawing Sheets

U.S. PATENT DOCUMENTS

| | | | | |
|---|---|---|---|---|
| 4,633,296 | A | * | 12/1986 | Cham et al. ............ 375/240.18 |
| 4,780,761 | A | * | 10/1988 | Daly et al. ................ 375/240.2 |
| 4,939,583 | A | * | 7/1990 | Tsuboi et al. .......... 358/426.12 |
| 5,028,995 | A | * | 7/1991 | Izawa et al. ............ 375/240.12 |
| 5,121,216 | A | * | 6/1992 | Chen et al. .................. 382/239 |
| 5,184,316 | A | * | 2/1993 | Sugiyama ................... 708/203 |
| 5,301,032 | A | * | 4/1994 | Hong et al. ................. 382/250 |
| 5,333,212 | A | * | 7/1994 | Ligtenberg ................. 382/250 |
| 5,422,736 | A | * | 6/1995 | Katayama ................... 358/462 |
| 5,426,512 | A | * | 6/1995 | Watson ........................ 382/250 |
| 5,479,527 | A | * | 12/1995 | Chen ........................... 382/232 |
| 5,642,115 | A | * | 6/1997 | Chen ............................. 341/67 |
| 6,505,299 | B1 | * | 1/2003 | Zeng et al. ............. 375/E7.075 |
| 6,571,071 | B2 | | 5/2003 | Kanoshima et al. |
| 6,674,982 | B2 | | 1/2004 | Saitoh et al. |
| 6,725,372 | B1 | * | 4/2004 | Lewis et al. ............ 375/E7.187 |
| 7,114,073 | B2 | * | 9/2006 | Watanabe ................... 713/176 |
| 7,167,560 | B2 | * | 1/2007 | Yu .............................. 380/200 |
| 2002/0018565 | A1 | * | 2/2002 | Luttrell et al. .............. 380/217 |
| 2002/0188570 | A1 | * | 12/2002 | Holliman et al. ............. 705/57 |

FOREIGN PATENT DOCUMENTS

| | | |
|---|---|---|
| JP | 11-225323 A | 8/1999 |
| JP | 2000-253375 A | 9/2000 |

OTHER PUBLICATIONS

Changgui Shi and Bharat Bhargava, "An Efficient MPEG Video Encryption Algorithm", 1998, IEEE, pp. 381-386.*

Shi, C. et al., "An Efficient MPEG Video Encryption Algorithm," 1998 IEEE, pp. 381-386.

Noboru Katta, et al. "A new digital scrambling method for compressed video signals" The Institute of Electronics Information and Communication Engineers Dec. 7, 1992, pp. 19-29, vol. 92, No. 355, Osaka, Japan, Abstract.

U.S. Appl. No. 10/390,193, filed Mar. 14, 2003, Sakuyama.
U.S. Appl. No. 10/317,911, filed Dec. 11, 2002, Sano et al.
U.S. Appl. No. 10/390,263, filed Mar. 14, 2003, Kodama.
U.S. Appl. No. 10/372,479, filed Feb. 21, 2003, unknown.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/985,784, filed Nov. 6, 2001, Matsubara.
U.S. Appl. No. 09/847,192, filed May 2, 2001, Fukuda et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shoji et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.

* cited by examiner

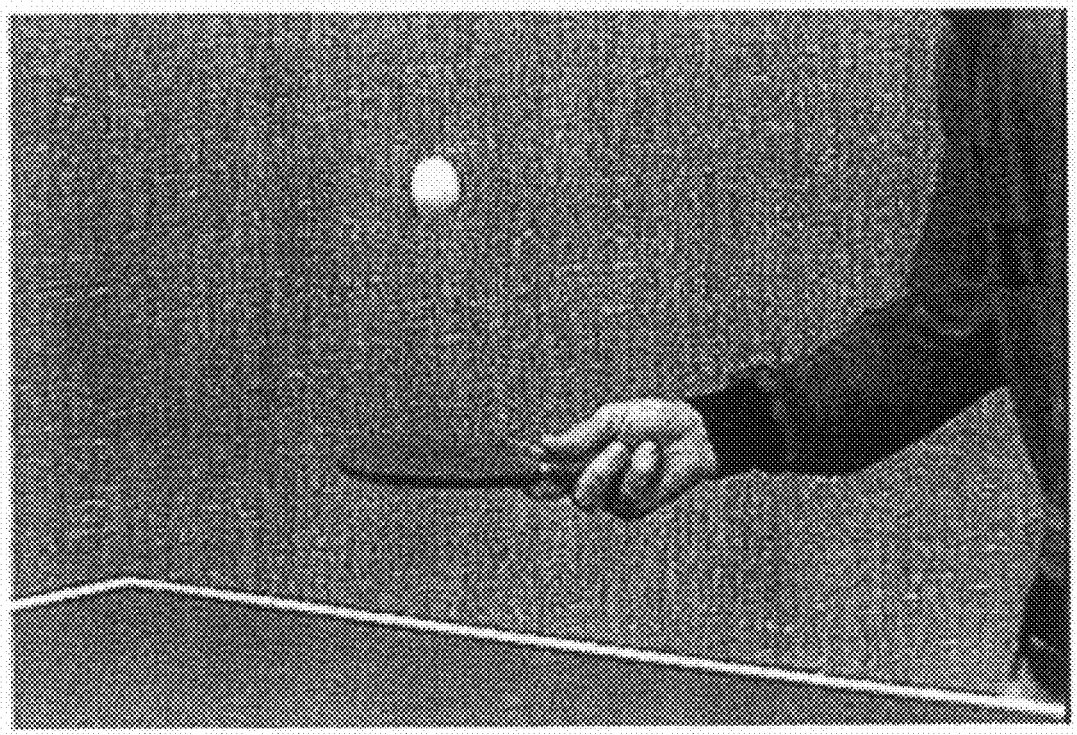

METHOD AND APPARATUS FOR ENCRYPTING AND COMPRESSING MULTIMEDIA DATA

BACKGROUND OF THE INVENTION

1. Field of the Invention

The present invention relates generally to a method and apparatus for encrypting and compressing multimedia data, and more particularly to a method and apparatus for encrypting and compressing multimedia data, which transforms and compresses multimedia data through a certain encryption key in a process of compressing the multimedia data to record and transmit the multimedia data, and which encrypts the multimedia data to allow the multimedia data to be decoded using only the encryption key used in the compressing process. The present application is based on Korean Patent Application No. 2002-72813, which is incorporated herein by reference.

2. Description of the Related Art

Moving Picture Experts Group (MPEG) standards are international standards for methods of compressing and storing, and transmitting moving images and audio data, and, methods of decompressing, processing and coding compressed information. The MPEG standards include MPEG-1, MPEG-2 and MPEG-4. Of the MPEG standards, MPEG-1 (ISO/CEI 11172), which is the most basic method of compressing multimedia data, eliminates or transforms duplicated information and compresses moving image signals by applying statistical properties to the remaining or transformed multimedia data.

MPEG standards use Discrete Cosine Transform (hereinafter referred to as "DCT") and quantization to remove spatial redundancy, use Differential Pulse Code Modulation (DPCM) to remove temporal redundancy, and additionally use entropy encoding including Run Length Coding (RLC) and Hoffmann coding.

Additionally, MPEG standards basically include Groups Of Pictures (GOPs) each of which is a set of frames. Each of the GOPs includes an Intra-frame (I-frame), a forward Predicted frame (P-frame) and a Bi-directional predicted frame (B-frame).

Recently, as a wireless communication technology has developed and a mobile communication technology has been widely used, multimedia services based on the compressing method have been offered, and therefore the security of data provided through the multimedia services has been further required.

That is, corresponding services should be provided only to users having service use rights. For example, movies are transmitted only to users having paid certain fees, or image information is transmitted only to users having rights by which they participate in secret conferences.

The Data Encryption Standard (hereinafter referred to as "DES") adopted as an international standard algorithm in 1997, is generally used as an encryption algorithm.

DES is a block encryption algorithm that processes a block unit of plain text using a symmetric key, and is used to transmit and reproduce compressed multimedia data for providing secure multimedia services.

U.S. Pat. No. 6,021,199 entitled "Motion picture data encrypting method and computer system and motion picture data encoding/decoding apparatus to which encrypting method is applied" discloses a method of encrypting multimedia data using an MPEG compression method that selectively encrypts the I-frames of MPEG data through DES, using the property of the I-frame to include original image information, thus reducing the amount of data.

A process of encrypting multimedia data using such an MPEG compression method is carried out as shown in FIGS. 1 and 2.

That is, many of the values of an 8×8 block become 0 through DCT and quantization processes, as shown in FIG. 1. To efficiently process the frame data described above, the values of Differential Coefficients (hereinafter referred to as "DC coefficients") and Amplitude Coefficients (hereinafter referred to as "AC coefficients") are read in a zig-zag order, for example, in the order of DC, AC1, AC2, ..., and AC63, compressed through an entropy encoding process (100), and encrypted through the DES encryption process (200).

Additionally, as shown in FIG. 2, a multimedia data producer receives a public key sent from multimedia data receivers at step 1, and generates a symmetric key needed to decode encrypted multimedia data provided through multimedia services, encrypts the generated symmetric key using the public key sent from the receiver and sends the symmetric key to the receiver at step 2.

The producer periodically changes the symmetric key used in the DES and therefore improves the security of data at step 3.

A method of encrypting MPEG data using the shared symmetric key according to a DES algorithm requires resources for processing encrypting and decoding processes because the encrypting and decoding processes are complicated.

Additionally, since the method cannot improve a data compression ratio of multimedia data, the method is not suitable for real time multimedia services provided to wireless mobile terminals.

Accordingly, there have been demands for a multimedia security system that efficiently handles limits of the bandwidth resources of a wireless network environment and limits of the computation resources of a mobile terminal.

SUMMARY OF THE INVENTION

Accordingly, the present invention has been made keeping in mind the above problems occurring in the related art, and an object of the present invention is to provide a method and apparatus for encrypting and compressing multimedia data, in which entropy encoding is carried out depending on a certain encryption key at the time of entropy encoding in an MPEG compression process, and multimedia data is encrypted and compressed depending on transformed encoded results.

Another object of the present invention is to provide a method and apparatus for encrypting and compressing multimedia data, in which a coding process is performed using certain symmetric keys, thus improving a data compression ratio.

The method for encrypting and compressing multimedia data according to the present invention includes the steps of: creating DCT coefficients by applying input multimedia data to a DCT unit, and quantizing the created DCT coefficients; encrypting and compressing DC and AC coefficients transformed by transforming encoded DC and AC coefficients depending on a certain encryption key at the time of entropy encoding quantized DC and AC coefficients of the quantized DCT coefficients; and Huffmann coding the encrypted DC and AC coefficients using a Huffmann table and outputting the coded DC and AC coefficients.

Additionally, the apparatus for encrypting and compressing multimedia data according to the present invention includes: a DCT unit for creating DCT coefficients including AC and DC coefficients by DCT transforming multimedia data into discrete signals; a quantization unit for quantizing the created DCT coefficients using a quantization table; and an entropy encryption encoding unit for encrypting quantized AC and DC coefficients by entropy encoding the quantized AC and DC coefficients using a certain encryption key.

BRIEF DESCRIPTION OF THE DRAWINGS

The above and other objects, features and other advantages of the present invention will be more clearly understood from the following detailed description taken in conjunction with the accompanying drawings, in which:

FIGS. 6a to 6c are views showing an original image and encrypted and compressed results thereof according to the present invention.

DESCRIPTION OF THE EXEMPLARY EMBODIMENTS

Hereinafter, a method and apparatus for encrypting and compressing multimedia data according to embodiments of the present invention will be described in detail with reference to the attached drawings.

A method and apparatus for encrypting and compressing multimedia data is implemented based on an H.261 moving picture compression algorithm of MPEG-1. The meanings of terms for explaining compression processes, and hierarchical structures are defined in the H.261 moving picture compression algorithm of MPEG-1.

Accordingly, when the method and apparatus for encrypting and compressing multimedia data are explained, the detailed description of the meanings of terms, hierarchical structures and various kinds of parameters, which may obscure the point of the present invention, will be omitted.

Additionally, in the present invention, DC and AC coefficients are encrypted by different methods through the use of symmetric keys. The DC coefficient is encrypted by a method in which codes are changed according to an encryption key, as provided in "An Efficient MPEG Video Encryption Algorithm" by Shi and Bhargava. The AC coefficient is encrypted by a method additionally performing lossy compression.

The apparatus for encrypting and compressing multimedia data will be described in detail with reference to FIG. 3.

Figure 1:
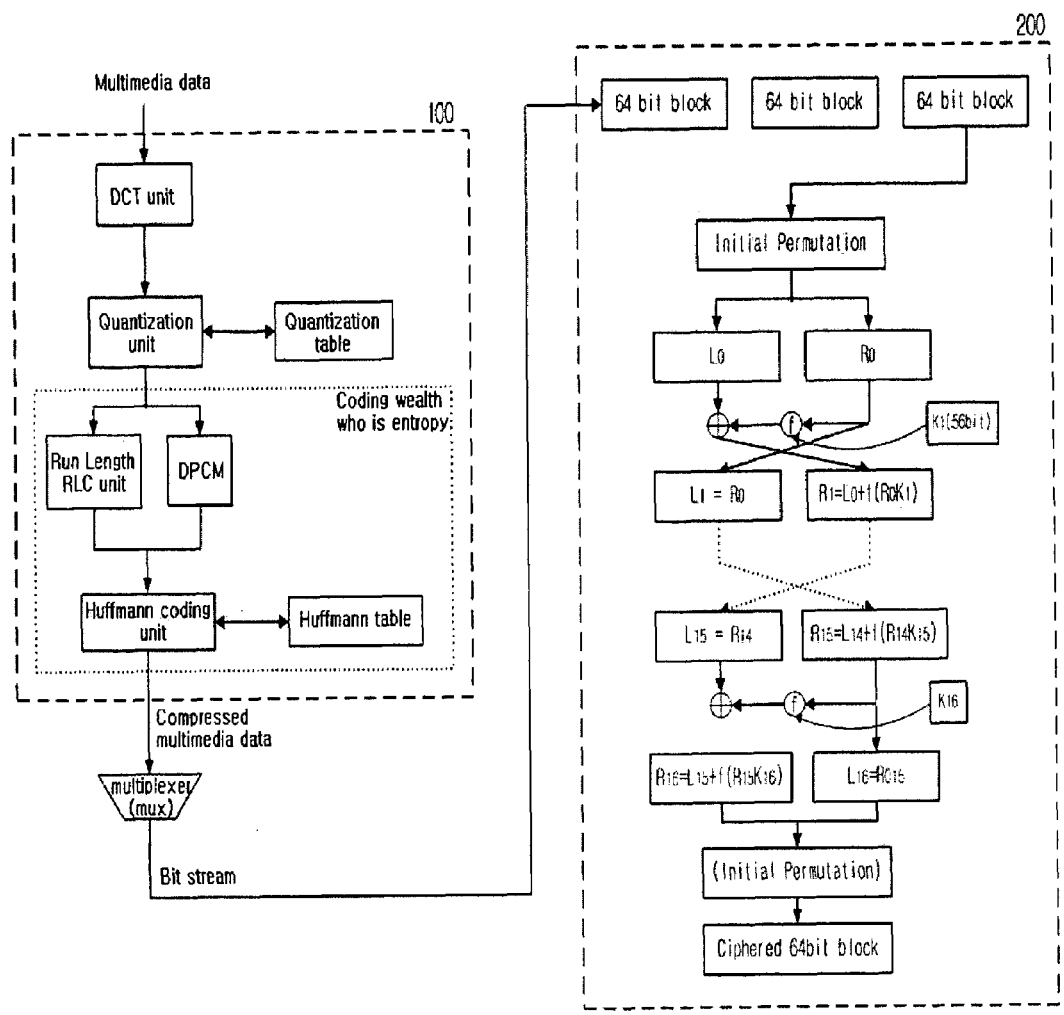
FIG. 1 is a view showing a schematic construction of a conventional apparatus for encrypting multimedia data through DES using an MPEG compression method.
Figure 2:
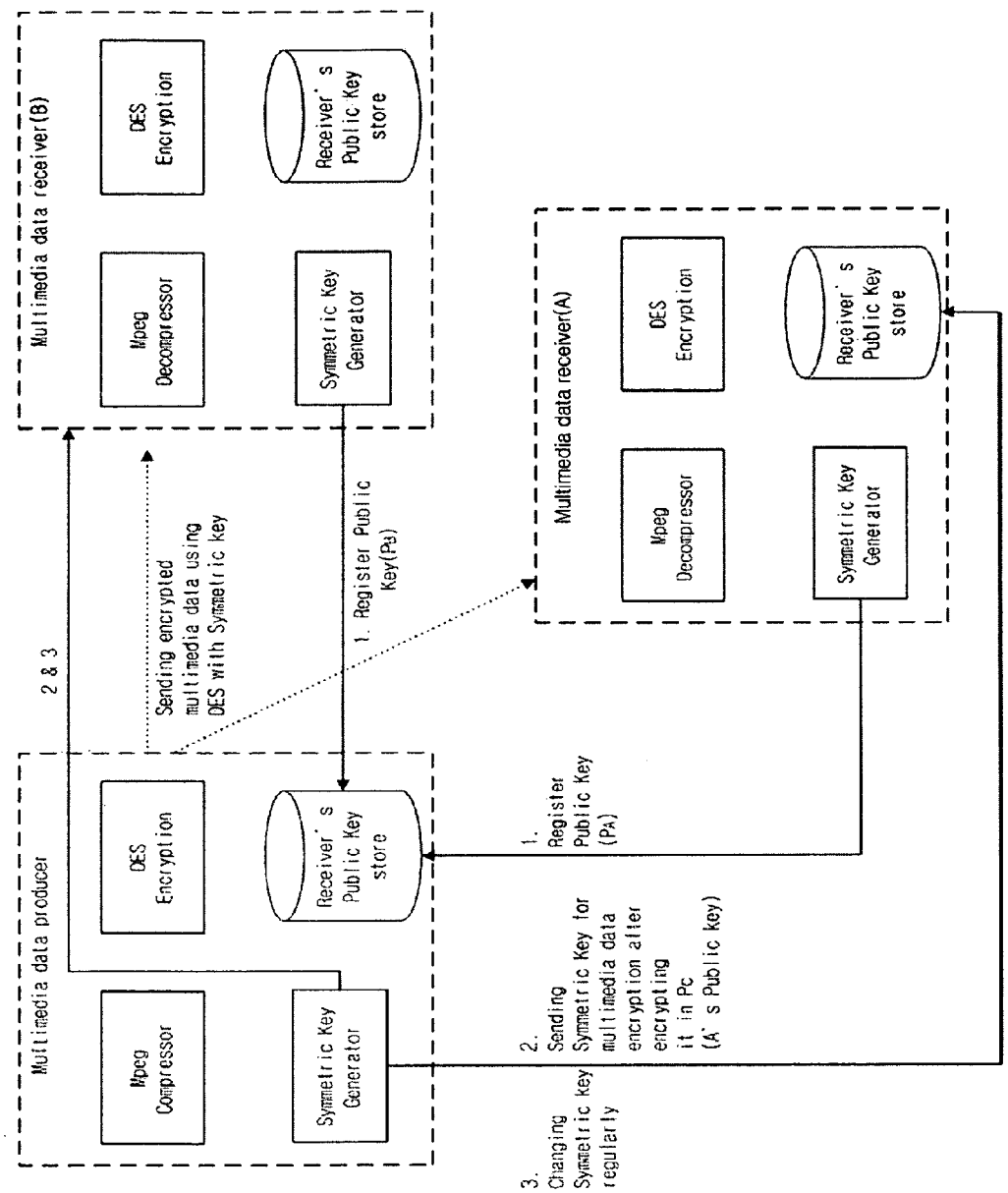
FIG. 2 is a view showing a schematic construction of a conventional system for encrypting multimedia data through the DES using an MPEG compression method.
Figure 3:
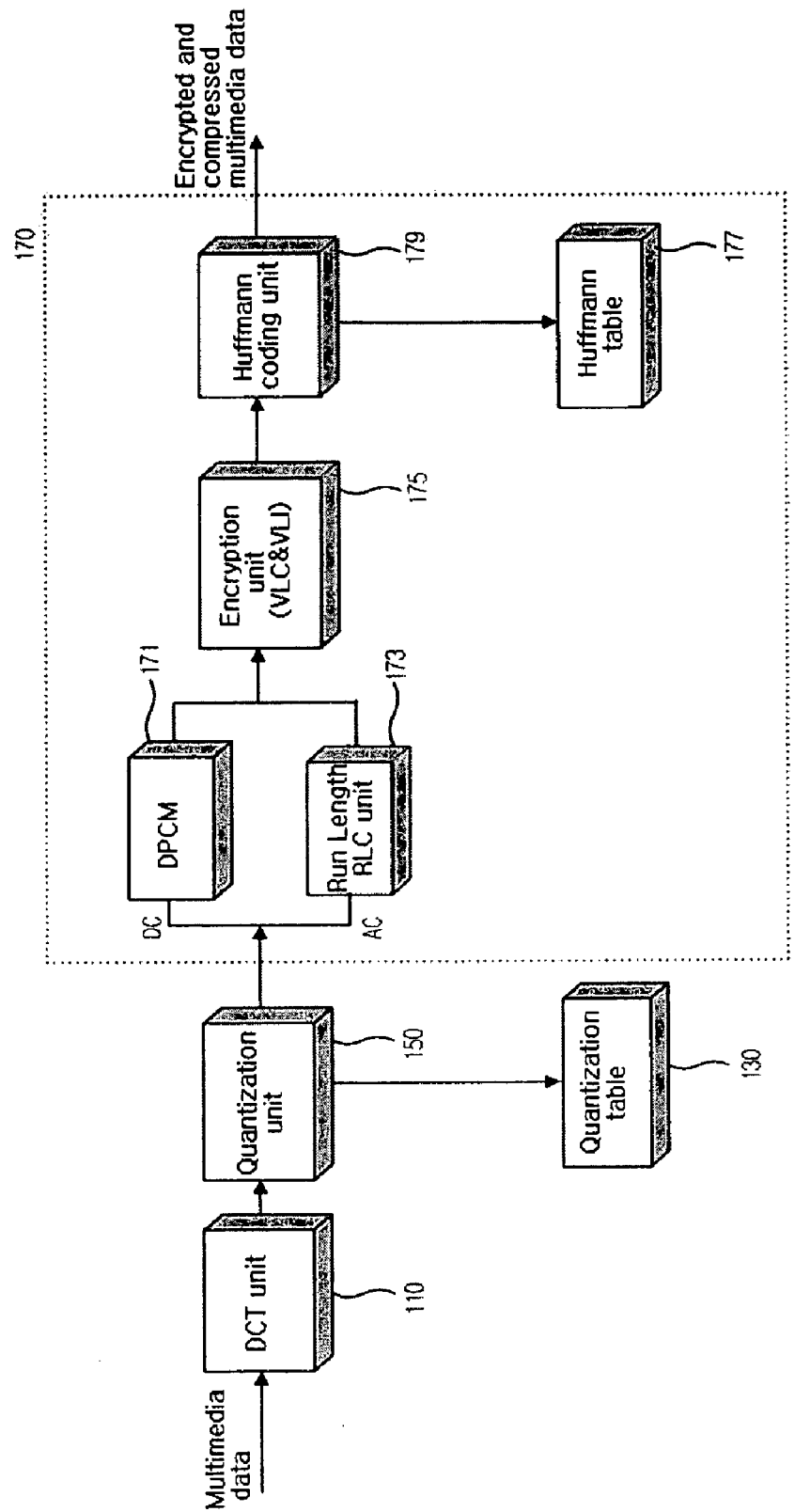
FIG. 3 is a view showing a schematic construction of an apparatus for encrypting and compressing multimedia data according to the present invention.

As shown in FIG. 3, the apparatus for encrypting and compressing multimedia data according to the present invention includes a DCT unit 110 that creates DCT coefficients including AC and DC coefficients by DCT transforming input multimedia data into discrete signals, a quantization unit 150 that quantizes the created DCT coefficients using a quantization table 130, and an entropy encryption encoding unit 170 that encrypts quantized AC and DC coefficients by entropy encoding the quantized AC and DC coefficients using a certain encryption key.

The entropy encryption encoding unit 170 includes a DPCM unit 171 that pulse modulates the quantized DC coefficient of the DCT coefficients, an RLC unit 173 that scans the quantized AC coefficient of the DCT coefficients in a zig-zag run manner, an encryption unit 175 that encrypts the DC and AC coefficients using a Variable Length Code (VLC) and a Variable Length Integer (VLI) of each of the DC and AC coefficients obtained by the DPCM unit 171 and the RLC unit 173, and a Huffmann coding unit 179 that Huffmann codes the encrypted DC and AC coefficients using a Huffmann table 177.

The method for encrypting and compressing multimedia data using the apparatus described above includes the steps of: creating a DCT coefficient by applying input multimedia data to the DCT unit 110, and quantizing the created DCT coefficients; encrypting and compressing DC and AC coefficients transformed by transforming encoded DC and AC coefficients depending on a certain encryption key at the time of entropy encoding quantized DC and AC coefficients of the quantized DCT coefficients; and Huffmann coding the encrypted DC and AC coefficients using the Huffmann table 177 and outputting the coded DC and AC coefficients.

The step of encrypting and compressing the DC and AC coefficients includes the steps of: differential pulse code modulating on the quantized DC coefficients and performing RLC of the quantized AC coefficient; determining the encryption key of the AC and DC coefficients and a random constant r indicating a start bit of the encryption key, using variable length information, which is a VLC and a VLI, of each of the DC and AC coefficients obtained through the DPCM and the RLC; and encrypting the AC and DC coefficients using the determined encryption key.

The step of encrypting the DC coefficient includes the steps of: determining whether a value of an r-th bit is "1" in the determined encryption key of the DC coefficient; and transforming the DC coefficient by performing an exclusive logical sum operation between the V-LGVLI of the DC coefficient and 11111111 if the determination result is "1".

The step of encrypting the AC coefficient includes the steps of: determining whether a value of an r-th bit is "1" in the determined encryption key of the AC coefficient; right-shifting the VLI of the AC coefficient if the determination result is "1"; determining the VLC of the AC coefficient through the right-shifted VLI using the Huffmann table; and transforming the AC coefficient using the determined VLC and VLI.

The encryption key includes two symmetric keys, and the symmetric keys are VLCs of the AC and DC coefficients, respectively. Accordingly, the DC and AC coefficients are entropy encoded on the basis of the VLC of each of the DC and AC coefficients, and variable encoded results are compressed to be decoded by only the VLC.

An embodiment of the method for encrypting and compressing multimedia data will be described in detail with reference to the attached drawings.

For example, a vector matrix of (DC, AC1, AC2, . . . , AC63) according to a zig-zag order is shown in the following Table 1.

TABLE 1

| 3 | 0 | 0 | 0 | 0 | 0 | 0 | 0 |
| 0 | 0 | 0 | 0 | 0 | 0 | 0 | 0 |
| 0 | 7 | 0 | 0 | 0 | 0 | 0 | 0 |
| 0 | 0 | 0 | 0 | 0 | 0 | 0 | 0 |

TABLE 1-continued

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

TABLE 2

| Range of DIFF(k) value | Bit size (m) | Huffmann code |
|---|---|---|
| 0 | 0 | 00 |
| −1, 1 | 1 | 010 |
| −3, −2, 2, 3 | 2 | 011 |
| −7, . . . , −4, 4, . . . , 7 | 3 | 100 |
| . | . | . |
| −255, . . . , −128, 128, . . . , 255 | 8 | 1111110 |

An 8×8 block is zig-zag scanned using the DC and AC coefficients. The DC coefficient is encoded to a VLC indicating a minimum bit size for expressing the DC coefficient using the Huffmann Table, and a VLI indicating a bit corresponding to the VLC in the DC coefficient.

According to the embodiment, since the DC coefficient is "3", the minimum bit size for expressing "3" is determined to be "2" with reference on Table 2 (Huffmann Code for the DC coefficient).

Accordingly, the VLC of the DC coefficient is 2(011), and the VLI indicating a bit corresponding to "2" of the bit size of the VLC from the least significant bit of 011 expressing "3" of the DC coefficient becomes 11.

Additionally, an entropy encoded result of the DC coefficient including the VLC and the VLI is 01111.

The AC coefficient is a series of bit stream, in which the number of repetitions I of "0" and a bit size m for expressing a non-zero number is compressed using RLC. According to the present invention, the number of repetitions I is "7", and the bit size m for expressing non-zero number "7" is "3" with reference to the following Table 3 (AC coefficient magnitude category for bit size table).

TABLE 3

| Bit size | Range of AC value |
|---|---|
| 0 | 0 |
| 1 | −1, 1 |
| 2 | −3, −2, 2, 3 |
| 3 | −7, . . . , −4, 4, . . . , 7 |
| 4 | −15, . . . , −8, 8, . . . , 15 |
| . | . |
| 10 | −1023, . . . , −512, 512, . . . , 1023 |

TABLE 4

| Run/Level | Bits | VLC |
|---|---|---|
| 7/1 | 8 | 11111010 |
| 7/2 | 12 | 111111111011 |
| 7/3 | 16 | 1111111110101110 |
| 7/4 | 16 | 1111111110101111 |
| 7/5 | 16 | 1111111110110000 |
| 7/6 | 16 | 1111111110110001 |
| 7/7 | 16 | 1111111110110010 |
| 7/8 | 16 | 1111111110110011 |

TABLE 4-continued

| Run/Level | Bits | VLC |
|---|---|---|
| 7/9 | 16 | 1111111110110100 |
| 7/A | 16 | 1111111110110101 |

Accordingly, if the VLC corresponding to (7, 3) is determined using Table 4 (Typical AC Huffmann Code Table), the VLC of the AC coefficient is 1111111110101110.

Since the VLI indicating a bit size of "3" for expressing "7" in the VLC is 110, an entropy encoded result of the AC coefficient including the VLC and the VLI is 1111111110101110110.

That is, if the VLC and VLI of each of the DC and AC coefficients are created through the DPCM unit 171 and the RLC unit 173 of the entropy encryption encoding unit 170 according to the processes, encryption and compression processes are carried out using the VLCs and VLIs.

Encryption and compression processes using the VLC and VLI of each of the DC and AC coefficients will be described with reference to FIG. 4.

Figure 4:
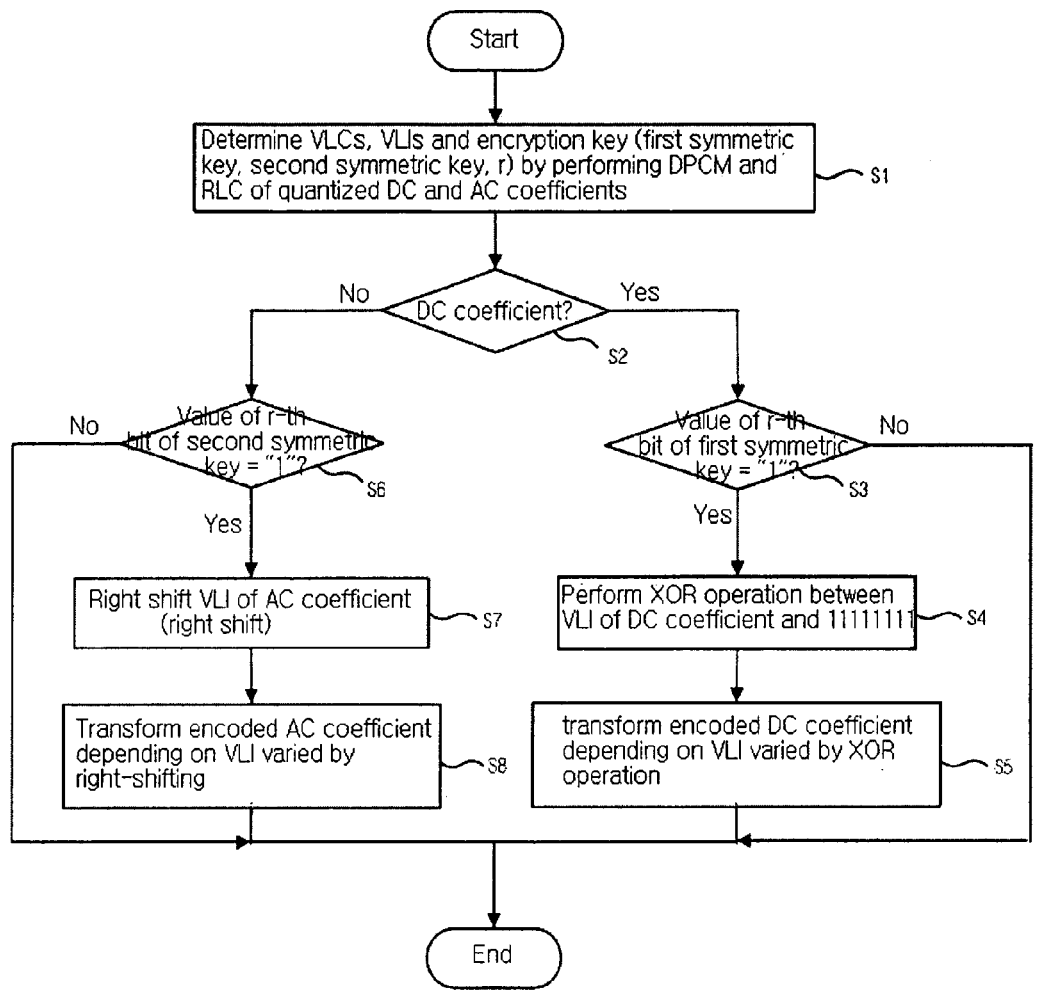
FIG. 4 is a flowchart showing a method for encrypting and compressing multimedia data according to the present invention.

As shown in FIG. 4, the VLC and VLI of each of the DC and AC coefficients are generated by performing DPCM and RLC of the quantized DC and AC coefficients, respectively, and an encryption key (hereinafter referred to as "first and second symmetric keys") and a random constant r indicating the start bit of the first or second symmetric key 2 are determined using the generated VLC and VLI of each of the DC and AC coefficients at step S1. The first and second symmetric keys are determined by the VLCs of the DC and AC coefficients, and the key 1 is defined as the VLC of the DC coefficient and the key 2 is defined as the VLC of the AC coefficient.

If the first and second symmetric keys and the random constant are determined, it is determined whether a key corresponds to the DC coefficient at step S2.

If a key corresponds to the DC coefficient as a result of the determination of step S2, it is determined whether the value of a bit corresponding to the random constant designated in the first symmetric key is "1" at step S3. If the value of the bit is "1", an exclusive logical sum (XOR) operation between the VLI of the DC coefficient and 11111111 is performed at step S4.

An encoded DC coefficient is transformed depending on a value of the VLI varied by the XOR operation with 11111111 at step S5.

That is, if it is assumed that the random constant is "2" and applied to the embodiment, and a value of a second bit of the VLI is "1" in the DC coefficient, in which the VLC is 011 and the VLI is 11, so that a result of the XOR operation with 11111111 is 11111100.

In the XOR operated result, the VLI constructed by extracting a bit corresponding to "2" of the bit size of the VLC becomes 00.

Accordingly, the encoded DC coefficient is transformed to 01100 by the variable VLI.

If a key does not correspond to the DC coefficient as a result of the determination of step S2, it is determined whether the value of the bit corresponding to the random constant designated in the second symmetric key is "1" at step S6. If the value of the bit is "1", the VLI of the AC coefficient is right-shifted at step S7.

An encoded AC coefficient is transformed depending on the value of the VLI varied by the right-shifting at step S8.

That is, according to the embodiment, since the second bit of the VLI is "1" in the AC coefficient in which the VLC is 1111111110101110 and the VLI is 110, the VLI becomes 011 if the VLI is right-shifted.

Since the VLI is 3(011) as the result of step S8, "2" of the minimum size bit for expressing "3" can be applied to the AC coefficient, so that the AC coefficient is transformed from (7, 3) to (7, 2).

Accordingly, if Table 4 is searched for the VLC corresponding to (7, 2), the VLC is 111111110111, and the VLI constructed by extracting a bit corresponding to the bit size of the VLC is 11.

The encoded AC coefficient transformed by the variable VLI is 1111111011111.

As described above, compressed AC and DC coefficients are encrypted so that they can be decoded through only the first and second symmetric keys, which are the encryption key.

Figure 5:
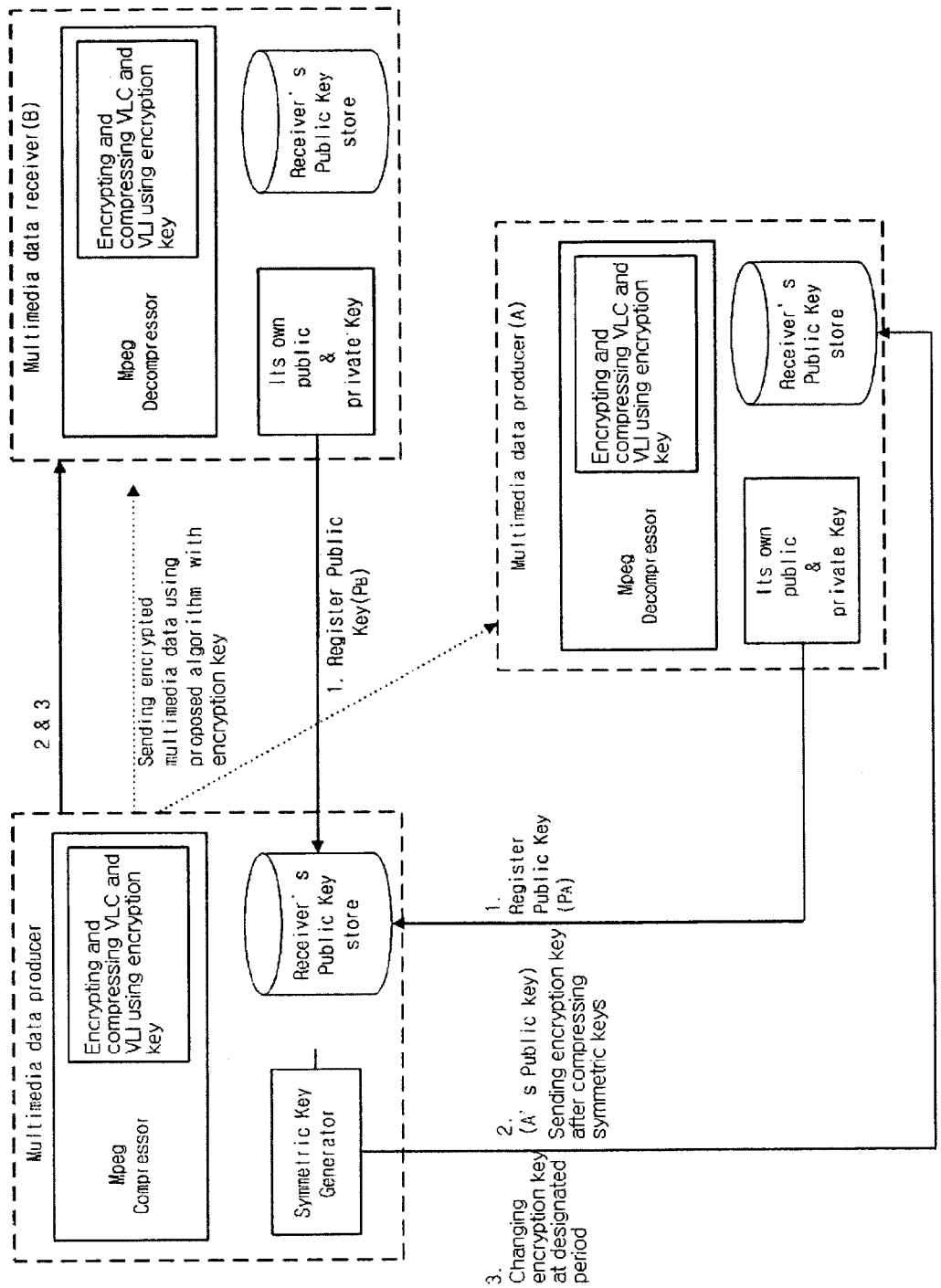
FIG. 5 is a view showing a schematic construction of a system including the encrypting and compressing apparatus according to the present invention.

If the first and second symmetric keys are determined through the processes and multimedia data is encrypted and compressed, the multimedia data producer receives a public key from the multimedia data receiver B, and the first and second symmetric keys are encrypted through the public key of the multimedia data receiver B and sent to the receiver, as shown in FIG. 5.

Multimedia data receivers decode the multimedia data using their own private keys so that compressed multimedia data provided through the multimedia services can be decoded.

That is, since the multimedia data is encoded depending on the first and second symmetric keys and the random constant r, multimedia data cannot be decoded and reproduced if a user does not know the first and second symmetric keys, so that security of the multimedia data can be ensured.

The multimedia data producer periodically changes the first and second symmetric keys and the random constant r to increase security of the multimedia data. The random constant r is changed more often than the first and second symmetric keys, so that a time T at an interval of which the first and second symmetric keys are changed is longer than a time t at an interval of which the random constant r is changed.

Additionally, the bit stream of the AC coefficient is reduced and a data compression ratio is improved through the above described encrypting and compressing processes according to the present invention. In the present invention, the AC coefficient is transformed from (7, 3) to (7, 2) through the above described encoding process using the second symmetric key, so that the AC coefficient can be reduced by 5 bits.

Accordingly, when it is considered that the 8×8 block is a part of a macro block of a slice layer in a frame, a considerable compression effect can be expected in a total moving image file.

Figure 6A:
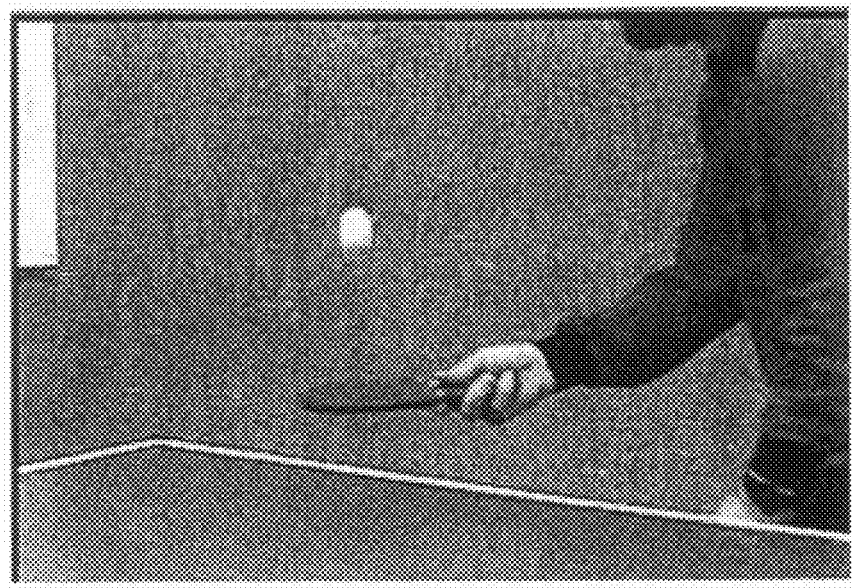
Figure 6B:
Figure 7A:
FIGS. 7a to 7c are views showing another original image and encrypted and compressed results thereof according to the present invention.
Figure 7B:
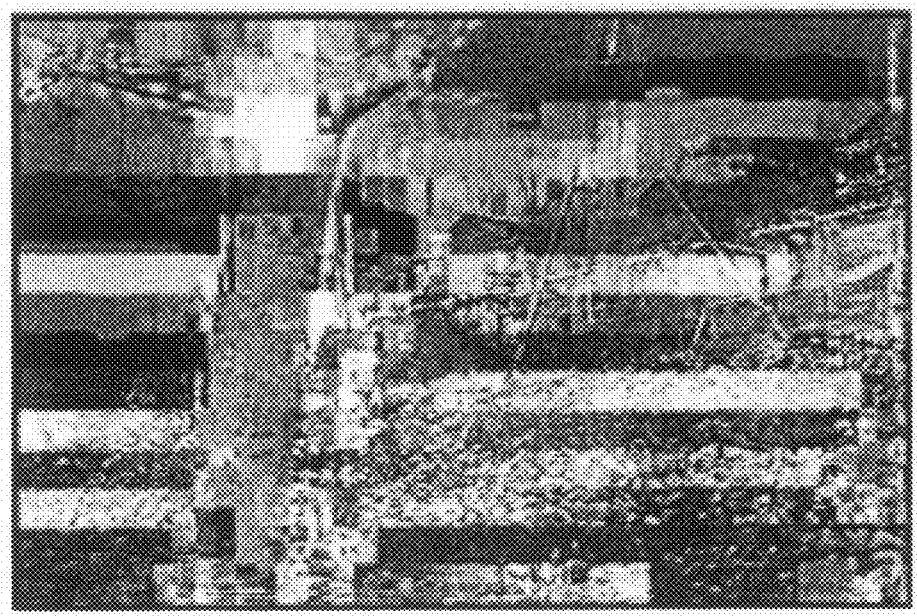

Such encrypted and compressed results will be described with reference to FIGS. 6a to 6c and FIGS. 7a to 7c. FIGS. 6a and 7a illustrate original images, and FIGS. 6b and 7b illustrate encrypted and compressed results of the original images.

Figure 7C:

Decoded results of the encrypted and compressed images using the first and second symmetric keys according to the present invention are shown in FIGS. 6c and 7c.

As shown in FIGS. 6c and 7c, effective encoded and decoded results can be obtained through simple operations, such as XOR operation and right-shifting, according to the present invention.

Additionally, a conventional data compression ratio compared to a data compression ratio according to the encrypted and compressed results of the present invention shown in FIGS. 6a to 6c and 7a to 7c are arranged in Table 5.

From Table 5, it is confirmed that the data compression ratio according to the present invention will be remarkably higher than the conventional data compression ratio.

TABLE 5

|  | FIGS. 6a to 6c | | FIGS. 7a to 7c | |
| --- | --- | --- | --- | --- |
|  | Compression ratio | Size | Compression ratio | Size |
| MPEG Standard | 81:1 | 31231 (bytes) | 40:1 | 174387 |
| Present invention | 118:1 | 21455 | 52:1 | 133968 |

Table 6 illustrates overhead required to calculate a corresponding frame. In the case of FIGS. 6a to 6c, 0.05746 seconds is additionally taken compared to a compression method according to the MPEG standard, so that the overhead of 1.32% is shown. In the case of FIGS. 7a to 7c, 0.039373 seconds is additionally taken compared to the compression method according to the MPEG standard, so that the overhead of 0.88% is shown.

From the results, it can be appreciated that the generated overhead according to the present invention is a negligible small value.

TABLE 6

|  | FIGS. 6a to 6c | FIGS. 7a to 7c |
| --- | --- | --- |
| MPEG standard | 3.321732 (second per frame) | 3.564230 |
| Present invention | 3.378378 | 3.603603 |

As described above, according to the present invention, encrypting and decoding processes are not complicated because input multimedia data is encrypted using entropy encoding results varied depending on a certain encryption key, so that the present invention is suitable for multimedia services for mobile terminals and a data compression ratio is high, thus being effective in multimedia processing on a wireless communication.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for encrypting and compressing multimedia data, comprising the steps of:
    creating Discrete Cosine Transform (DCT) coefficients including Differential Coefficients (DC coefficients) and Amplitude Coefficients (AC coefficients) by applying input multimedia data to a DCT unit, and quantizing the DC coefficients and the AC coefficients included in the created DCT coefficients;
    compressing the quantized DC coefficients and the quantized AC coefficients by entropy encoding the quantized DC coefficients and the quantized AC coefficients;
    encrypting the compressed DC coefficients and the compressed AC coefficients using an encryption key; and
    Huffmann coding the compressed and encrypted DC and AC coefficients using a Huffmann table and outputting the Huffman coded DC and AC coefficients.

2. The method according to claim 1, wherein the step of compressing the quantized DC coefficients and the quantized AC coefficients comprises entropy encoding the quantized DC coefficients and the quantized AC coefficients by performing Differential Pulse Code Modulation (DPCM) on the quantized DC coefficients and Run Length Coding (RLC) on the quantized AC coefficients, and wherein the encrypting the compressed DC coefficients and the compressed AC coefficients comprises:

determining the encryption key to encrypt the compressed AC coefficients and the compressed DC coefficients and a random constant r indicating a start bit of the encryption key, using variable length information including a Variable Length Code (VLC) and a Variable Length Integer (VLI) of each of the entropy encoded DC and AC coefficients obtained through the DPCM and the RLC; and encrypting the compressed AC coefficients and the compressed DC coefficients using the determined encryption key.

3. The method according to claim 2, wherein the step of encrypting the compressed AC coefficients and the compressed DC coefficients comprises the steps of:

determining whether a value of an r-th bit is "1" in the determined encryption key of the DC coefficient; and transforming the DC coefficient by performing an exclusive logical sum operation between the VLI of the DC coefficient and 11111111 if the determined value is "1".

4. The method according to claim 2, wherein the step of encrypting the compressed AC coefficients and the compressed DC coefficients comprises the steps of:

determining whether a value of an r-th bit is "1" in the determined encryption key of the AC coefficient;

right-shifting the VLI of the AC coefficient if the determined value is "1";

determining the VLC of the AC coefficient through the right-shifted VLI using the Huffmann table; and transforming the AC coefficient using the determined VLC and VLI.

5. The method according to claim 4, wherein the encryption key includes first and second symmetric keys, and the symmetric keys are VLCs of the AC and DC coefficients, respectively.

6. An apparatus for encrypting and compressing multimedia data, comprising:

a DCT unit for creating DCT coefficients including AC and DC coefficients by DCT transforming input multimedia data into discrete signals;

a quantization unit for quantizing the created DCT coefficients using a quantization table; and an entropy encryption encoding unit for encrypting quantized AC and DC coefficients by entropy encoding the quantized AC and DC coefficients and encrypting the entropy encoded AC and DC coefficients using a certain encryption key, wherein the certain encryption key is based on a Variable Length Code (VLC) and a Variable Length Integer (VLI) of the entropy encoded AC and DC coefficients.

7. The apparatus according to claim 6, wherein the entropy encryption encoding unit comprises:

a DPCM unit for pulse modulating the quantized DC coefficient of the DCT coefficients;

an RLC unit for scanning the quantized AC coefficient of the DCT coefficients in a zig-zag run manner;

an encryption unit for encrypting the DC and AC coefficients using the VLC and the VLI of each of the DC and AC coefficients obtained by the DPCM unit and the RLC unit; and a Huffmann coding unit for Huffmann coding the encrypted DC and AC coefficients using a Huffmann table.

\* \* \* \* \*